(12) United States Patent
Satoh et al.

(10) Patent No.: US 9,120,281 B2
(45) Date of Patent: Sep. 1, 2015

(54) BLADDER FOR TIRE VULCANIZATION AND TIRE VULCANIZATION DEVICE

(71) Applicant: The Yokohama Rubber Co., LTD., Minato-ku, Tokyo (JP)

(72) Inventors: Hajime Satoh, Hiratsuka (JP); Tsuyoshi Nomaguchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/345,212

(22) PCT Filed: Sep. 24, 2012

(86) PCT No.: PCT/JP2012/074365
§ 371 (c)(1),
(2) Date: Mar. 14, 2014

(87) PCT Pub. No.: WO2013/047422
PCT Pub. Date: Apr. 4, 2013

(65) Prior Publication Data
US 2015/0079211 A1    Mar. 19, 2015

(30) Foreign Application Priority Data

Sep. 30, 2011 (JP) ................................. 2011-216043

(51) Int. Cl.
*B29D 30/06* (2006.01)
*B29C 43/36* (2006.01)

(52) U.S. Cl.
CPC ..... *B29D 30/0654* (2013.01); *B29C 2043/3649* (2013.01); *B29D 2030/0655* (2013.01); *B29D 2030/0659* (2013.01)

(58) Field of Classification Search
CPC ................... B29D 30/0654; B29D 2030/0655; B29D 2030/0657; B29D 2030/0659

USPC ........................................................... 425/52
See application file for complete search history.

(56) References Cited

U.S. PATENT DOCUMENTS 2,695,424 A * 11/1954 Madison et al. ................. 425/53
2,790,205 A * 4/1957 Parker .............................. 425/52

(Continued)

FOREIGN PATENT DOCUMENTS

| GB | 938797 | * | 10/1963 |
| JP | 61-162306 | * | 7/1986 |

(Continued)

OTHER PUBLICATIONS

International Search Report dated Nov. 27, 2012, 4 pages, Japan.

*Primary Examiner* — James Mackey
(74) *Attorney, Agent, or Firm* — Thorpe North & Western (57) ABSTRACT

By providing projections 4 extending intermittently or continuously on the inner wall face of the cylindrical shaped bladder 2 at an inclination to the circumferential direction thereof, during vulcanization of a green tire G when the inside of the bladder 2 is filled by injecting with hot water as heating medium H and pressurizing medium, or steam as heating medium H and a gas as pressurizing medium, the heating medium H is guided along the projections 4 and flows in the circumferential direction of the expanded bladder 2, and flows in a rotating motion in the vertical direction of the bladder 2, and as a result of the synergistic action of the circular flow of the heating medium H in the circumferential direction of the bladder and the rotating flow in the vertical direction of the bladder, the temperature difference of the bladder 2 is sufficiently reduced.

9 Claims, 5 Drawing Sheets

(56) References Cited

U.S. PATENT DOCUMENTS 3,970,416 A * 7/1976 Mattson .......................... 425/52
3,989,429 A * 11/1976 Mattson .......................... 425/52
4,082,490 A * 4/1978 Chateau .......................... 425/52
4,293,293 A * 10/1981 MacMillan ..................... 425/52

FOREIGN PATENT DOCUMENTS

| | | |
|---|---|---|
| JP | 2004/122650 | 4/2004 |
| JP | 2010/110971 | 5/2010 |
| JP | 2012/135939 | 7/2012 |

* cited by examiner

BLADDER FOR TIRE VULCANIZATION AND TIRE VULCANIZATION DEVICE

TECHNICAL FIELD

The present technology relates to a bladder for tire vulcanization and a tire vulcanization device, and more particularly relates to a bladder for tire vulcanization and a tire vulcanization device that can greatly reduce temperature differences in the bladder when vulcanizing green tires by hot water vulcanization or gas vulcanization.

BACKGROUND

Conventionally, when vulcanizing large tires such as large OR tires or the like, hot water vulcanization is used in which hot water is injected into the bladder to fill it and vulcanize the green tire. This is because the temperature setting range of hot water vulcanization is large compared with steam vulcanization, and the pressure can be increased. Also, the energy density per unit volume of hot water is high, so it is suited to vulcanization of large tires whose wall thickness is comparatively large.

However, in the case of hot water vulcanization the hot water that contacts the internal walls of the bladder loses heat, and the temperature drops. As a result the density of the water increases, and the water moves downward as a cold water mass and accumulates at a height that is at the same temperature. Therefore a vertical temperature difference is produced within the bladder, and a temperature difference is also produced in the outer surface of the bladder in contact with the green tire. For example, the maximum temperature difference in the vulcanization temperature can be about 50° C.

In the case of steam vulcanization, saturated water vapor that heats the inner wall of the bladder immediately condenses, and flows down the inner wall. If the consumed steam is replenished the same thing is repeated when the saturated water vapor continuously contacts the inner wall of the bladder, so the inner wall of the bladder is maintained at the constant temperature of the saturated water vapor. Therefore, a uniform temperature can be maintained except in the drain where the condensed water accumulates.

If the vertical temperature difference in the vulcanization bladder as described above is excessive, the quality of the vulcanized tire will be variable, so it is important to make the temperature difference of the bladder as small as possible. The problem of the temperature difference in the bladder described above also occurs for gas vulcanization using steam as the heating medium and nitrogen gas or the like as the pressurizing medium Although not for hot water vulcanization, various methods and devices have been proposed to reduce the temperature difference when vulcanizing a green tire by agitating the heating medium within the bladder (for example, see Japanese Unexamined Patent Application Publication No. S56-28843 and Japanese Unexamined Patent Application Publication No. H06-238670). However, these conventional methods and devices were unable to sufficiently reduce the temperature difference of the bladder.

SUMMARY

The present technology provides a bladder for tire vulcanization and a tire vulcanization device that can greatly reduce temperature difference in the bladder when vulcanizing green tires by hot water vulcanization or gas vulcanization.

The bladder for tire vulcanization according to the present technology comprises: projections extending intermittently or continuously on the inner wall face of the cylindrical shaped bladder at an inclination to the circumferential direction thereof, wherein during vulcanization of a green tire the inside of the bladder is filled with hot water as heating medium and pressurizing medium, or steam as heating medium and a gas as pressurizing medium.

The tire vulcanization device according to the present technology comprises: the bladder for tire vulcanization as described above; and a central mechanism having bead retention portions that retain a top side bead portion and a bottom side bead portion of the bladder, wherein an injection nozzle that injects hot water as heating medium and pressurizing medium, or steam as heating medium and a gas as pressurizing medium into the bladder, and a discharge aperture that discharges the injected hot water as heating medium and pressurizing medium, or steam as heating medium and a gas as pressurizing medium to the outside of the bladder, are provided in the central mechanism.

According to the present embodiment, projections are provided extending intermittently or continuously on the inner wall face of the cylindrical shaped bladder at an inclination to the circumferential direction thereof, so during vulcanization of a green tire when the inside of the bladder is filled by injecting with hot water as heating medium and pressurizing medium, or steam as heating medium and a gas as pressurizing medium, the heating medium is guided along the projections and flows in the circumferential direction of the annular bladder, and flows in a rotating motion in the vertical direction of the bladder. As a result of the synergistic action of the circular flow of the heating medium in the circumferential direction of the bladder and the rotating flow in the vertical direction of the bladder, the heating medium is agitated and the temperature difference of the bladder can be sufficiently reduced.

In a specification in which the projections extend intermittently, providing the projections is advantageous for preventing excessive increase in the stiffness of the bladder. Therefore it is possible to minimize the reduction in extensibility of the bladder. In a specification in which the projections extend continuously, the rotating flow of the heating medium in the vertical direction of the bladder can be easily generated, which is further advantageous for reducing the temperature difference of the bladder.

In the bladder for tire vulcanization according to the present technology, the inclination of the projections with respect to the circumferential direction of the bladder is set, for example, within the range of minus 30° to plus 30°. As a result of this inclination angle range, the heating medium can be easily guided smoothly in the circumferential direction and the vertical direction of the bladder by the projections, which is beneficial for reducing the temperature difference of the bladder.

The thickness of the projections is set, for example, less than or equal to the thickness of the bladder when expanded. This is advantageous for minimizing the reduction in thermal conductivity and the reduction in the extensibility of the bladder.

The height of the projections should be set in the range of, for example, 3 to 5 times the thickness of the projections, taking into consideration the ease of generating the rotating flow in the vertical direction of the bladder and ease of manufacture of the projections.

In the tire vulcanization device according to the present technology, a specification in which a plurality of at least one of the injection nozzle and the discharge aperture is provided can be adopted. A specification in which the injection pressure of the hot water as heating medium and pressurizing medium or the steam as heating medium and the gas as pressurizing medium injected from the injection nozzle is set 200 kPa to 500 kPa higher than the discharge pressure of the hot water as heating medium and pressurizing medium or the steam as heating medium and the gas as pressurizing medium discharged from the discharge aperture can be adopted. According to these specifications, the heating medium can be easily made to flow smoothly within the bladder, which is advantageous for reducing the temperature difference of the bladder.

A specification in which the direction of injection of the injection nozzle is set to the tangential direction of the expanded annular bladder in plan view can be adopted. According to this specification, it is easy to reduce the shock received by the inner wall face of the bladder from the heating medium or the pressurizing medium that is injected inside the bladder. Therefore, it is possible to reduce the occurrence of problems of reduction in thickness and degradation caused by the phenomenon of erosion due to the mechanical action and the phenomenon of corrosion due to the chemical action of the heating medium on the inner wall face of the bladder. This has the advantage that the lifetime of the bladder can be extended.

DETAILED DESCRIPTION

The bladder for tire vulcanization and the tire vulcanization device according to the present technology is described below, based on the embodiments illustrated on the drawings.

Figure 1:
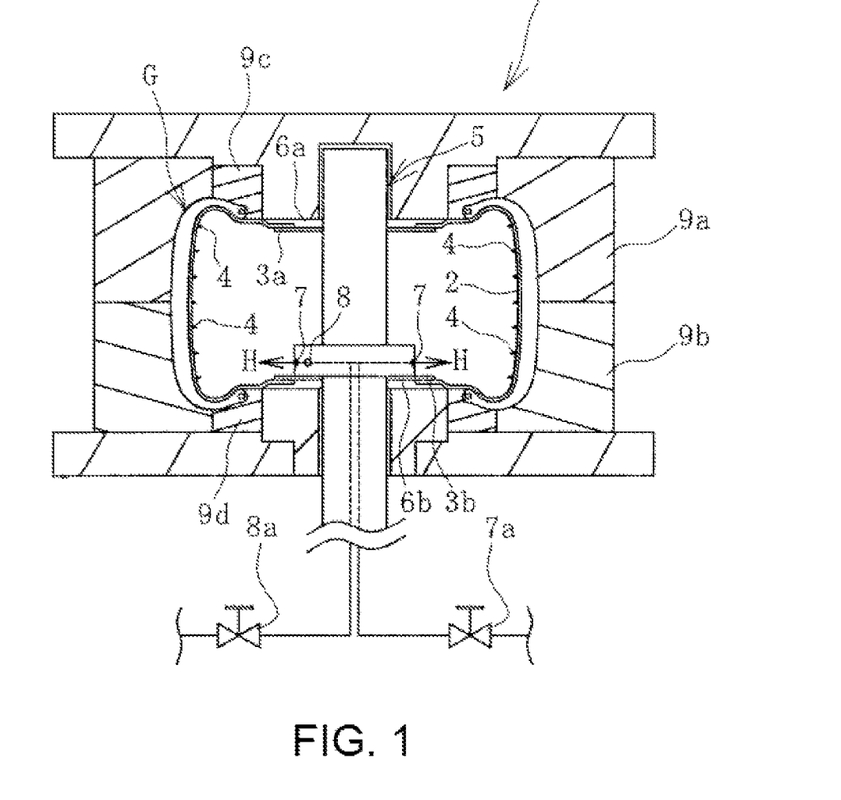
FIG. 1 is an explanatory illustration of an overall schematic vertical section of a vulcanization device that includes a bladder for tire vulcanization according to the present technology.
Figure 2:
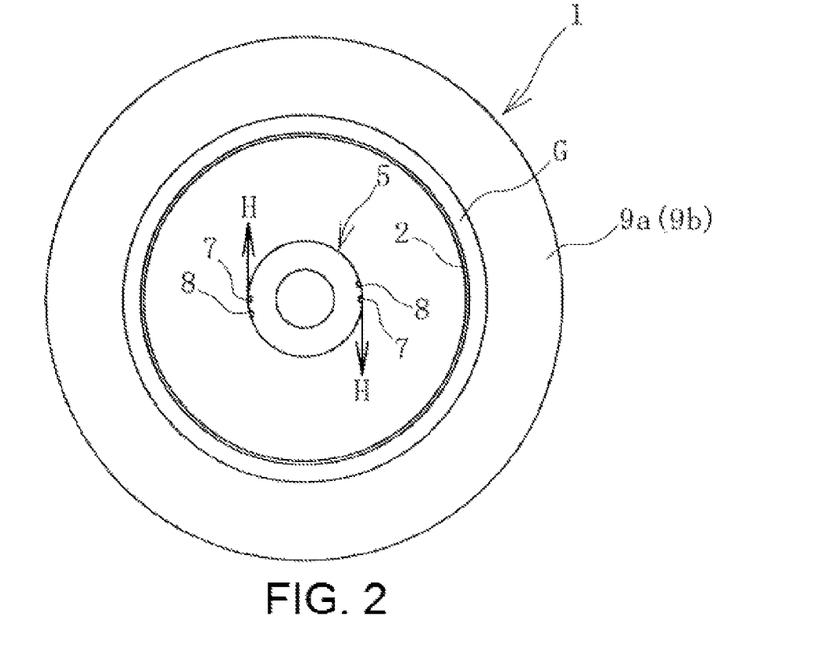
FIG. 2 is an explanatory illustration of a horizontal section of the inside of the vulcanization device.

As shown in FIGS. 1 and 2, a tire vulcanization device 1 according to the present technology includes a bladder 2 for tire vulcanization according to the present technology (hereafter referred to as bladder 2), and a central mechanism 5 that includes a circular disk shaped top side bead retaining portion 6a and a bottom side bead retaining portion 6b that retain a top side bead portion 3a and a bottom side bead portion 3b of the bladder 2 respectively. A center post of the central mechanism 5 is provided with an injection nozzle 7 that injects a heating medium H into the bladder 2, and a discharge aperture 8 that discharges to the outside of the bladder 2 the heating medium H that has been injected inside the bladder 2.

Control valves 7a, 8a are disposed on an injection line that is connected to the injection nozzle 7 and a discharge line that is connected to the discharge aperture 8 respectively. The operations of injecting and discharging the heating medium H are carried out by controlling the opening and closing of the control valves 7a, 8a.

A green tire G is placed inside a mold 9a, 9b, 9c, 9d (hereafter referred to as mold 9 when the whole mold is meant), and the rubber cylindrical shaped bladder 2 is placed inside the green tire G. Therefore, the injection nozzle 7 and the discharge aperture 8 are disposed on the inside of the bladder 2. When vulcanizing the green tire G, the heating medium H is injected into the bladder 2 which is filled and heats the inner circumferential surface of the green tire G while expanding in an annular shape along and pressing against the inner wall face of the green tire G. Hot water is used as the heating medium H (and as a pressurizing medium). In this embodiment, the mold 9 includes a top side mold 9a, a bottom side mold 9b, an annular top plate 9c, and an annular bottom plate 9d.

The injection direction of the heating medium H of the injection nozzle 7 is set so that, when viewed in plan, it is the tangential direction of the expanded annular bladder 2. A plurality of injection nozzles 7 and discharge apertures 8 is provided, but the number of each provided is not prescribed.

Figure 3:
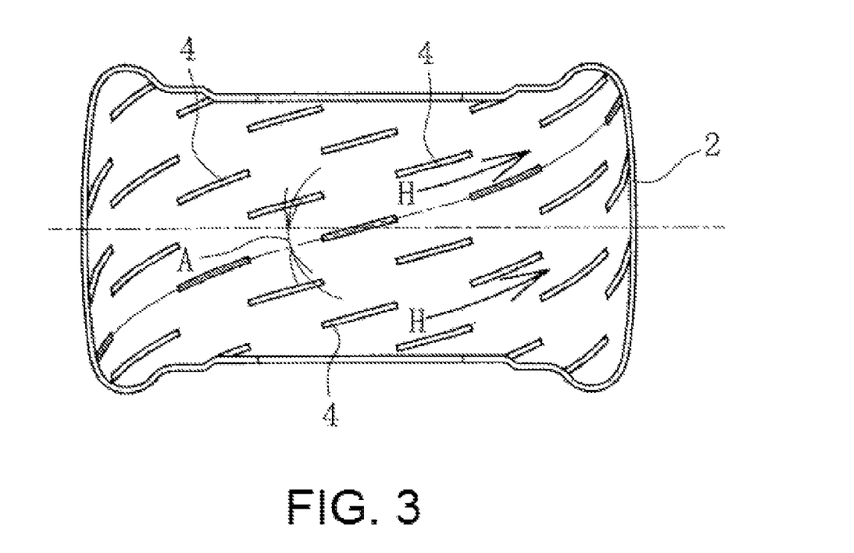
FIG. 3 is an explanatory illustration of a side surface view of the inner wall face of the bladder for tire vulcanization.

As shown in FIG. 3, projections 4 are provided on the inside wall face of the bladder 2 extending intermittently at an inclination to the circumferential direction which extends horizontally. In this embodiment, the projections 4 extend inclined upwards relative to the horizontal direction which is the direction that the heating medium H is injected in a side view from the center position of the annulus of the bladder 2. In other words, in this embodiment, the projections 4 are formed intermittently on the inner wall face of the annular bladder 2 in a spiral form in the direction of a right-hand screw relative to the direction of flow of the heating medium H. The length in the extending direction of the projections 4 is, for example, about 50 to 100 mm, and the spacing of adjacent projections 4 in the extending direction is about 50 to 100 mm.

When a green tire G is vulcanized using this vulcanization device 1, the heating medium H is injected into the bladder 2 that is disposed inside the green tire G with the mold 9 closed, and the filled bladder 2 is expanded. The temperature of the heating medium H is about 120° C. to 180° C. Then the inner circumferential surface of the green tire G is pressed by the expanded bladder 2 against the mold 9 and the green tire G is heated. During vulcanization heating medium H is injected from the injection nozzle 7 and discharged from the discharge aperture 8 in order to heat the green tire G to a predetermined temperature while applying a predetermined pressure.

Figure 4:
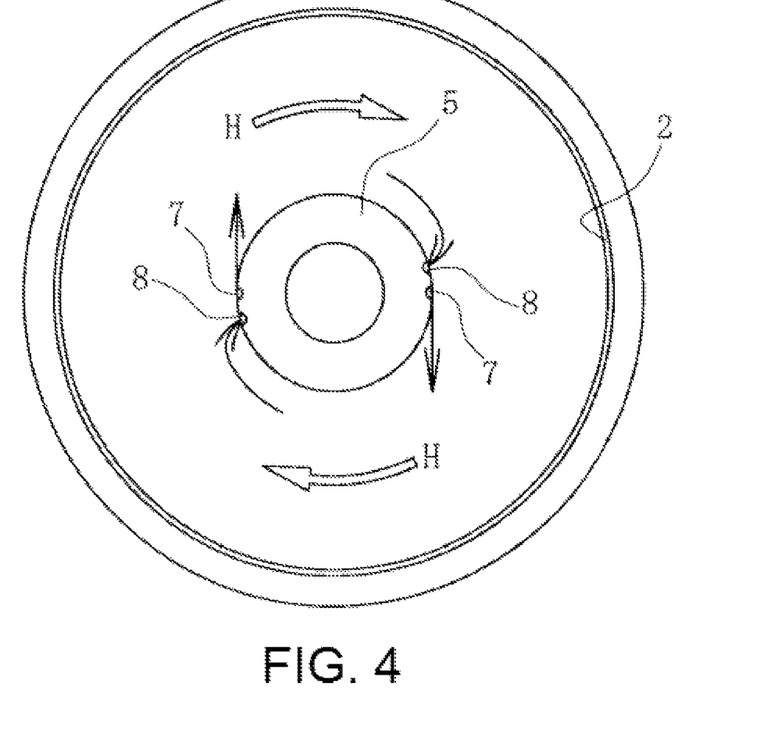
FIG. 4 is an explanatory illustration of a horizontal section of the flow of the heating medium inside the bladder for tire vulcanization.
Figures 5, 6:
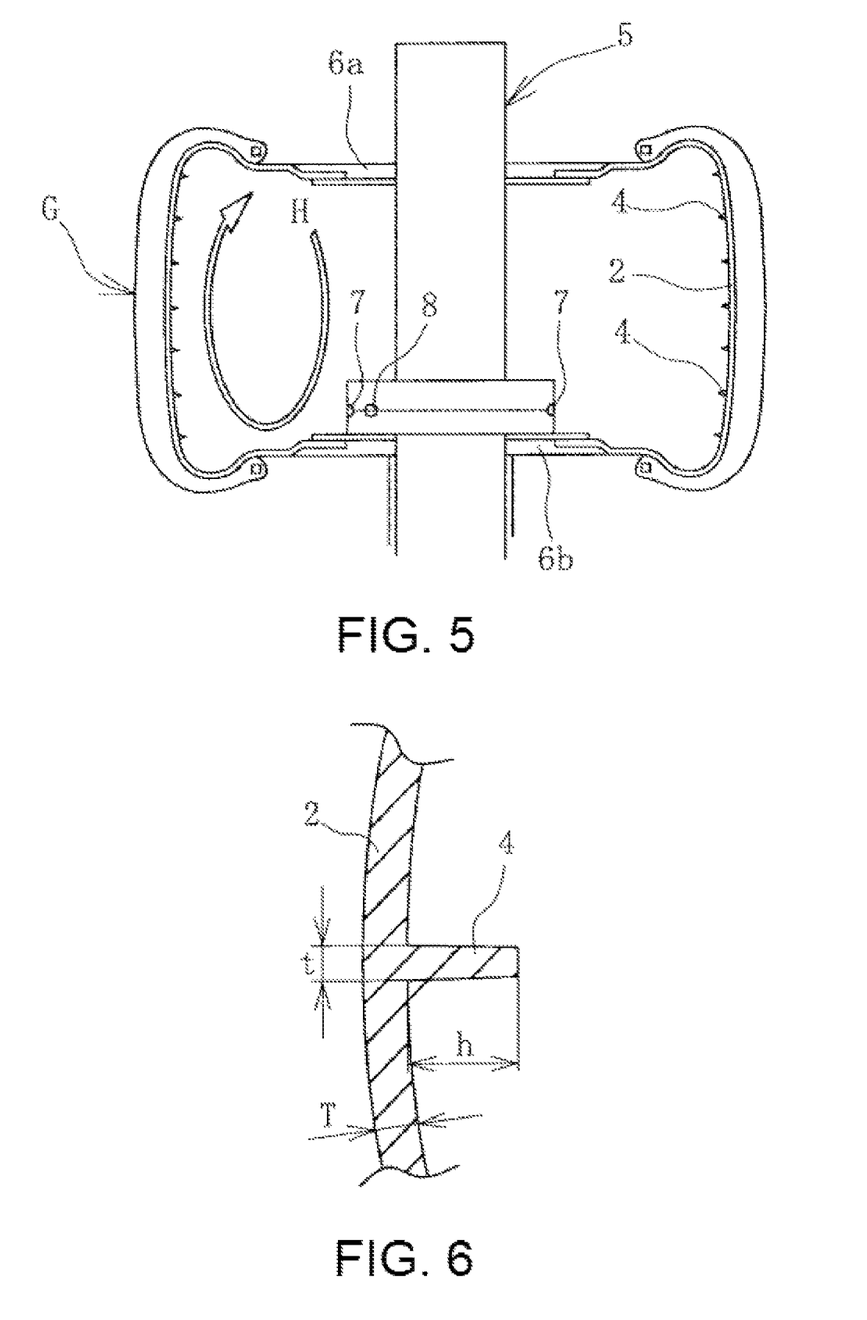
FIG. 5 is an explanatory illustration of a vertical section of the flow of the heating medium inside the bladder for tire vulcanization.
FIG. 6 is a partial enlarged cross-sectional view of the bladder for tire vulcanization.

According to the present technology, the projections 4 that extend intermittently inclined at an inclination to the circumferential direction are provided on the inner wall face of the annular bladder 2, so the heating medium H that is injected inside the bladder 2 is guided along the projections 4, and flows in the circumferential direction of the annular bladder 2 as shown in FIG. 4, and flows in a rotating movement in the vertical direction of the bladder 2 as shown in FIG. 5. In other words, a circular flow in the bladder circumferential direction and a rotating flow about the bladder vertical direction are generated in the heating medium H, and as a result of the synergistic action of the circular flow and the rotating flow, the heating medium H within the bladder 2 is sufficiently agitated, so it is possible to make the temperature difference in the vertical direction and the temperature difference in the circumferential direction of the bladder 2 sufficiently small, and it is possible to make the temperature virtually uniform in the whole bladder 2.

The inclination angle A of the projections 4 with respect to the bladder circumferential direction is, for example, set in the range of minus 30° to plus 30° (excluding 0°). As a result of this inclination angle range, the heating medium H can be easily guided smoothly in the circumferential direction and the vertical direction of the bladder 2 by the projections 4, which is beneficial for reducing the temperature difference of the bladder 2. The plus inclination angle A and the minus inclination angle A are the inclination angles when the projections 4 are formed in a left-handed screw direction and a right-handed screw direction respectively.

The heating medium H that is injected into the bladder 2 from the injection nozzle 7 experiences a reduction in temperature and an increase in density after contacting the inner wall face of the bladder 2, so a force acts on the heating medium H so that it moves in the downward direction. Therefore, if the projections 4 extend in the minus inclination angle A as in this embodiment, the injected heating medium H is easily guided to flow by the projections 4. In addition, a rotating flow in which the heating medium H rotates in a right-handed screw direction from top to bottom in the cross-section of the bladder 2 can be easily generated, so this is beneficial for reducing the temperature difference of the bladder 2. Therefore, the inclination angle A of the projections 4 should preferably be set in the range minus 15° to minus 5°. In other words, the projections 4 may be formed in the right-handed screw direction rather than the left-handed screw direction. However, if the orientation of the circular flow is reversed, the relationship of right-handed screw and left-handed screw is reversed even though the projections 4 are the same, so the distinction between right-handed screw and left-handed screw is determined by the combination of the orientation of the circular flow of the heating medium H and the inclination angle of the projections 4.

As shown in FIG. 6, the thickness t of the projections 4 is set less than or equal to the thickness T of the bladder 2 when expanded (about 10 mm or less). The lower limit of the thickness t is about 3 mm. If the thickness t of the projections 4 is too large, the thermal conductivity at that area will be locally reduced. Also, the stiffness of the bladder 2 at that area will be locally increased, so it will be difficult to expand the bladder 2, and it has an adverse effect on the extensibility. Therefore, by making the thickness t of the projections 4 less than or equal to the thickness T, it is possible to sufficiently minimize the reduction in thermal conductivity and the reduction in extensibility of the bladder 2.

The greater the height h of the projections 4 the easier it is to generate the rotating flow in the heating medium H. On the other hand, the greater the height h of the projections 4, the more difficult it is to manufacture the bladder 2. Therefore, taking these into consideration, the height h of the projections 4 should be set within the range of 3 to 5 times the thickness t, for example.

The internal capacity of the bladder 2 during vulcanization is constant, so the rate of injection and the rate of discharge of heating medium H are the same. In order to effectively agitate the heating medium H injected from the injection nozzle 7 in the vertical direction, preferably the heating medium H is injected concentrated in a constant direction, but on the other hand preferably the flow of the heating medium H is discharged from the discharge aperture 8 at low velocity throughout the whole bladder 2 without creating agitation dead spaces.

Therefore, the spacing in the circumferential direction in the direction of flow of the heating medium H from adjacent injection nozzles 7 and discharge apertures 8 should be as large as possible, as shown in FIGS. 2 and 4. Also, if the injection pressure at which the heating medium H is injected from the injection nozzle 7 is set 200 kPa to 500 kPa higher than the discharge pressure at which the heating medium H is discharged from the discharge aperture 8, the heating medium H can be easily made to flow smoothly within the bladder 2, which is advantageous for reducing the temperature difference of the bladder 2.

If a plurality of injection nozzles 7 and discharge apertures 8 is provided, the heating medium H can be easily made to flow smoothly within the bladder 2, which is advantageous for reducing the temperature difference of the bladder 2. If a plurality of injection nozzles 7 is provided, the injection nozzles 7 should be provided at equal intervals in the circumferential direction. If a plurality of discharge apertures 8 is provided, the discharge apertures 8 should be provided at equal intervals in the circumferential direction.

For example, if one each of the injection nozzle 7 and the discharge aperture 8 is provided, the discharge aperture 8 should be disposed at a spacing of 180° or more in the circumferential direction in the direction of flow of the heating medium H from the injection nozzle 7. If two each of the injection nozzles 7 and the discharge apertures 8 are provided, the injection nozzles 7 should be disposed at 180° spacing from each other, and the discharge apertures 8 should be disposed at 180° spacing from each other.

In this embodiment, the projections 4 extend intermittently, so compared with a specification in which they extend continuously, it is advantageous for eliminating excessive stiffness of the bladder 2. Therefore it is possible to minimize the reduction in extensibility of the bladder 2.

Figure 7:
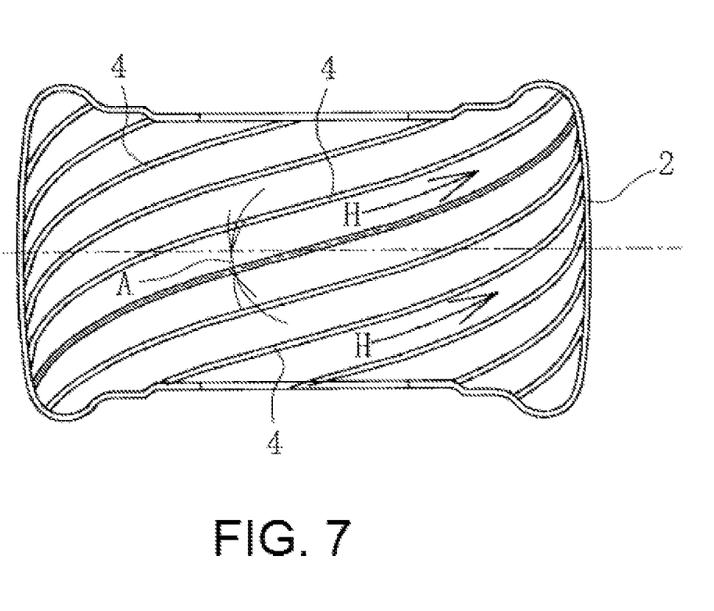
FIG. 7 is an explanatory illustration of a side surface view of the inner wall face of the bladder for tire vulcanization provided with a separate projecting portion.

As shown in FIG. 7, the projections 4 can extend continuously at an inclination to the circumferential direction on the inner wall face of the annular bladder 2. If the projections 4 extend continuously in this manner, the heating medium H can be guided more easily compared with a specification in which the projections 4 extend intermittently, so the rotation flow of the heating medium H can be easily generated, which is further advantageous for reducing the temperature difference of the bladder 2. The present technology can also be applied to gas vulcanization which uses steam as the heating medium H and various types of inactive gas as the pressurizing medium such as nitrogen gas, argon gas, deoxidized air, and so on.

As shown in the embodiment, preferably the injection direction of the heating medium H from the injection nozzle 7 is set to the tangential direction of the expanded annular bladder 2 in plan view. According to this specification, it is easy to reduce the shock received by the inner wall face of the bladder 2 from the heating medium H that is injected inside the bladder 2. In other words, the injected heating medium H does not directly impact the inner wall face of the bladder 2.

Therefore, it is possible to reduce the occurrence of problems of reduction in thickness and degradation caused by the phenomenon of erosion due to the mechanical action and the phenomenon of corrosion due to the chemical action of the heating medium H on the inner wall face of the bladder 2. This has the advantage that the lifetime of the bladder 2 is extended.

EXAMPLES

Green tires of OR tires of the same specification (size 2700R49 (external diameter 2700 mm, rim diameter 49 inches)) were hot water vulcanized varying only whether or not there were projections on the inner wall face of the bladder, and the maximum temperature difference of the inner liner of the green tires was measured during vulcanization. In the working examples the projections on the inner wall face of the bladder extended intermittently in a direction inclined at minus 15° with respect to the circumferential direction, as shown in FIG. 3. As a result the maximum temperature difference of the working examples was 8°, and the maximum temperature difference of the comparative examples which did not have projections was 28°.

The invention claimed is:

1. A bladder for tire vulcanization having a cylindrical shape, comprising: projections extending intermittently or continuously on an inner wall face of the bladder at an inclination to the circumferential direction thereof, wherein during vulcanization of a green tire the inside of the bladder is filled with hot water as heating medium and pressurizing medium, or steam as heating medium and a gas as pressurizing medium, and wherein the height of the projections is set within the range of 3 to 5 times the thickness thereof.

2. The bladder for tire vulcanization according to claim 1, wherein the inclination of the projections with respect to the circumferential direction of the bladder is set within the range of minus 30° to plus 30°.

3. The bladder for tire vulcanization according to claim 2, wherein the thickness of the projections is set to less than or equal to the thickness of the bladder when it is expanded.

4. A bladder for tire vulcanization having a cylindrical shape, comprising: projections extending intermittently or continuously on an inner wall face of the cylindrical shaped bladder at an inclination to the circumferential direction thereof, wherein:
   during vulcanization of a green tire the inside of the bladder is filled with hot water as heating medium and pressurizing medium, or steam as heating medium and a gas as pressurizing medium,
   the thickness of the projections is set to less than or equal to the thickness of the bladder when it is expanded, and
   the height of the projections is set within the range of 3 to 5 times the thickness thereof.

5. A tire vulcanization device, comprising:
   a bladder for tire vulcanization having a cylindrical shape, comprising projections extending intermittently or continuously on an inner wall face of the cylindrical shaped bladder at an inclination to the circumferential direction thereof, wherein during vulcanization of a green tire the inside of the bladder is filled with hot water as heating medium and pressurizing medium, or steam as heating medium and a gas as pressurizing medium, and the height of the projections is set within the range of 3 to 5 times the thickness thereof; and
   a central mechanism having bead retention portions that retain a top side bead portion and a bottom side bead portion of the bladder, wherein an injection nozzle that injects hot water as heating medium and pressurizing medium, or steam as heating medium and a gas as pressurizing medium into the bladder, and a discharge aperture that discharges the injected hot water as heating medium and pressurizing medium, or steam as heating medium and a gas as pressurizing medium to the outside of the bladder, are provided in the central mechanism.

6. The tire vulcanization device according to claim 5, wherein the direction of injection of the injection nozzle is set to the tangential direction of the bladder in plan view, when expanded.

7. A tire vulcanization device, comprising:
   a bladder for tire vulcanization having a cylindrical shape, comprising projections extending intermittently or continuously on an inner wall face of the cylindrical shaped bladder at an inclination to the circumferential direction thereof, wherein during vulcanization of a green tire the inside of the bladder is filled with hot water as heating medium and pressurizing medium, or steam as heating medium and a gas as pressurizing medium, and the height of the projections is set within the range of 3 to 5 times the thickness thereof; and
   a central mechanism having bead retention portions that retain a top side bead portion and a bottom side bead portion of the bladder, wherein an injection nozzle that injects hot water as heating medium and pressurizing medium, or steam as heating medium and a gas as pressurizing medium into the bladder, and a discharge aperture that discharges the injected hot water as heating medium and pressurizing medium, or steam as heating medium and a gas as pressurizing medium to the outside of the bladder, are provided in the central mechanism, and wherein a plurality of at least one of the injection nozzle and the discharge aperture is provided.

8. The tire vulcanization device according to claim 7, wherein the direction of injection of the injection nozzle is set to the tangential direction of the bladder in plan view, when expanded.

9. A bladder for tire vulcanization having a cylindrical shape, comprising: projections extending intermittently on an inner wall face of the bladder at an inclination to the circumferential direction thereof.

* * * * *